(12) United States Patent
Madonna et al.

(10) Patent No.: US 8,659,704 B2
(45) Date of Patent: Feb. 25, 2014

(54) APPARATUS AND METHOD FOR MIXING GRAPHICS WITH VIDEO IMAGES

(75) Inventors: Robert P. Madonna, Osterville, MA (US); Michael E. Noonan, Sandwich, MA (US); Siegmar K. Eschholz, Southwest Harbor, ME (US); James F. Allen, Sandwich, MA (US); Peter H. Corsini, East Sandwich, MA (US)

(73) Assignee: Savant Systems, LLC, Hyannis, MA (US)

( * ) Notice: Subject to any disclaimer, the term of this patent is extended or adjusted under 35 U.S.C. 154(b) by 1293 days.

(21) Appl. No.: 11/687,511

(22) Filed: Mar. 16, 2007

(65) Prior Publication Data

US 2012/0188459 A1    Jul. 26, 2012

Related U.S. Application Data

(63) Continuation-in-part of application No. 11/314,664, filed on Dec. 20, 2005.

(51) Int. Cl.
*H04N 9/74* (2006.01)

(52) U.S. Cl.
USPC ............ 348/587; 348/592; 348/600; 345/629

(58) Field of Classification Search
USPC ......... 348/563, 564, 565, 566, 569, 580, 581, 348/843, 298, 629, 634, 584–601; 345/629–641
See application file for complete search history.

(56) References Cited

U.S. PATENT DOCUMENTS

| | | | |
|---|---|---|---|
| 5,065,143 A * | 11/1991 | Greaves et al. | 345/603 |
| 5,426,731 A | 6/1995 | Masukane et al. | |
| 5,488,675 A * | 1/1996 | Hanna | 382/284 |
| 5,566,251 A * | 10/1996 | Hanna et al. | 382/284 |
| 5,581,629 A * | 12/1996 | Hanna et al. | 382/103 |
| 5,923,791 A * | 7/1999 | Hanna et al. | 382/295 |
| 6,909,438 B1 * | 6/2005 | White et al. | 345/629 |

(Continued)

FOREIGN PATENT DOCUMENTS

EP    0484981 A2    5/1992

OTHER PUBLICATIONS

"Notification of Transmittal of the International Search Report and the Written Opinion of the International Searching Authority, or the Declaration," International Filing Date: Dec. 20, 2006, International Application No. PCT/US2006/048625, Applicant: Savant Systems LLC, Date of Mailing: Nov. 6, 2007, pp. 1-23.

*Primary Examiner* — Michael Lee
(74) *Attorney, Agent, or Firm* — Cesari and McKenna, LLP

(57) ABSTRACT

In one embodiment, graphics from a general-purpose computer are mixed with video images from a video source. A first interface receives the graphics, the graphics including a plurality of graphics frames, at least some graphics frames including one or more regions having pixels set to one or more predetermined color values. A second interface receives video images from the video source, each video image corresponding to one of the plurality of graphics frames. A video mixer includes logic configured to recognize pixels in the at least some graphics frames that are set to the one or more predetermined color values, and in the one or more regions where the pixels are set to the one or more predetermined color values to mix pixels from the corresponding video image with the graphics frame, to create a plurality of mixed images. One or more output interfaces outputs the mixed images.

18 Claims, 8 Drawing Sheets

(56) References Cited

U.S. PATENT DOCUMENTS

| | | | |
|---|---|---|---|
| 2003/0184553 A1* | 10/2003 | Dawson | 345/581 |
| 2004/0085480 A1* | 5/2004 | Salzer et al. | 348/584 |
| 2004/0183949 A1* | 9/2004 | Lundberg et al. | 348/587 |
| 2004/0233333 A1* | 11/2004 | Chiu et al. | 348/589 |
| 2005/0134739 A1* | 6/2005 | Bian | 348/600 |

* cited by examiner

| 14:12 | 11:9 | 8 | 7:0 |
|---|---|---|---|
| BLEND MODE 730 | UNUSED | GRAPHICS ONLY BIT 720 | BLEND RATIO 710 |

FIG. 7

APPARATUS AND METHOD FOR MIXING GRAPHICS WITH VIDEO IMAGES

RELATED CASES

This application is a continuation-in-part of U.S. patent application Ser. No. 11/314,664, titled SYSTEM AND METHOD FOR A PROGRAMMABLE MULTIMEDIA CONTROLLER, filed on Dec. 20, 2005, and which is incorporated by reference herein.

BACKGROUND

1. Field of the Invention

The present invention relates generally to graphics, video images and/or other content, and more specifically to mixing graphics with video images or other content.

2. Background Information

On screen displays (OSDs) have become increasingly prevalent for use with video display devices, such as televisions and monitors. OSDs first began to appear in televisions in the mid 1980s, for example to display channel numbers and volume settings on the television screen, rather than on a separate indicator. By the late 1990s, OSDs began to appear in videocassette recorders (VCRs), for example to indicate when play, rewind, fast-forward, or other functions were activated. Virtually all digital video disc (DVD) players now utilize OSDs to display menu systems for control, configuration, and a variety of other functions. While a typical OSD may advantageously obviate the need for some external indicators, it is generally quite limited in its functionality. Often OSDs allow for only a very specific set of text and symbols to be displayed, for example, only a predefined set of text fonts and sizes, and only certain symbols loaded in a library. The text and symbols often must be formatted in a very particular manner, and commonly are of very limited detail. Further, the text and symbols generally must either replace the entire video image, i.e., forming a full-screen OSD that obscures the video image completely, or be displayed in limited, predefined regions over the video image, for example be displayed in a certain corner, while video images occupy the remainder of the display.

Accordingly, there is a need for an improved system and method for mixing graphics with video images or other content, which does not suffer from the limitations of prior approaches, and allows for a wider variety of different types of high-quality graphics to be mixed with video images or other content, in any desired display region.

SUMMARY

In an illustrative embodiment, a system and method for mixing graphics, for example graphics originating from a general-purpose computer, with video images, for example video images originating from an external video source, or with other content, is provided. The system and method permits a wide variety of different types of graphics (including computer graphics, text, full-motion video, still images, or other types of high quality visual data) to be mixed with video images of a video data signal, in any desired regions, the regions chosen on a pixel-by-pixel (or near pixel-by-pixel) basis. Further, the locations of the graphics may be dynamically changed on an image-by-image basis, readily permitting the movement of the graphics about a display screen, or permitting other "special effects." Further, using the techniques described herein, graphics may readily be blended with the video images, to display the graphics in a semi-transparent manner, with fade-in/fade-out effects, or with other types of "special effects."

In one configuration, keying and mixing logic looks to keying information incorporated into the graphics, to determine where the graphics should be displayed and where the video images should be displayed. The source of the graphics, for example a general-purpose computer, or a separate graphics processing device, sets the color value of pixels in each graphics frame according to a keying scheme, to designate regions where pixels of the video image should be displayed, and regions where pixels of the graphics frame should be displayed. Specifically, where the video image is desired to be displayed, pixel color values are changed to one or more predetermined color values. The keying and mixing logic recognizes pixels that are changed to the one or more predetermined color values, and mixes the graphics and the video images in response. In this manner, a mixed image is create that may be displayed to a user.

Various keying schemes may employ different predetermined color values. In one embodiment, a predetermined single color value may be used. In such an embodiment, color values of the pixels in a graphics frame are changed to a predetermined single color value where video image pixels are desired to be displayed. In another, preferred, embodiment, a pattern of predetermined color values occurring over multiple nearby pixels may be used, rather than a single predetermined color value. To detect the pattern, the keying and mixing logic performs a comparison on a number of pixels of the graphics frame. If the keying and mixing logic determines such a multi-pixel pattern is present, it then mixes the graphics and the video images, so that video image pixels are shown where the multi-pixel pattern is present. While in some configurations the keying and mixing logic may look for an exact match of a predetermined single color value, a pattern of predetermined color values, or other indicia, certain additional advantages may be obtained by looking instead for pixels with values above certain thresholds and/or having certain relative relationships.

In some configurations, graphics pixels may be passed unaltered, or may be blended with video images pixels to display graphics in a semi-transparent manner, with a fade-in or fade-out effect, or with some other type of "special effect." In one embodiment, a mode (i.e., a type) of blending, a ratio (i.e., a degree) of blending, and/or other characteristics of blending may be selected that are suited for a particular situation. Certain type of blending may be employed to advantageously minimize or otherwise obscuring certain artifacts, such as edge artifacts or "jaggies" (i.e., stairs-like lines that appear where there should be a smooth boundary), that may be a byproduct of mixing graphics and video images.

BRIEF DESCRIPTION OF THE DRAWINGS

The description of an illustrative embodiment below refers to the accompanying drawings, of which:

FIG. 7 is a diagram of an example data structure for specifying a blending ratio, a blending mode, and/or other characteristics of blending of graphics and video images.

DETAILED DESCRIPTION OF AN ILLUSTRATIVE EMBODIMENT

Figure 1:
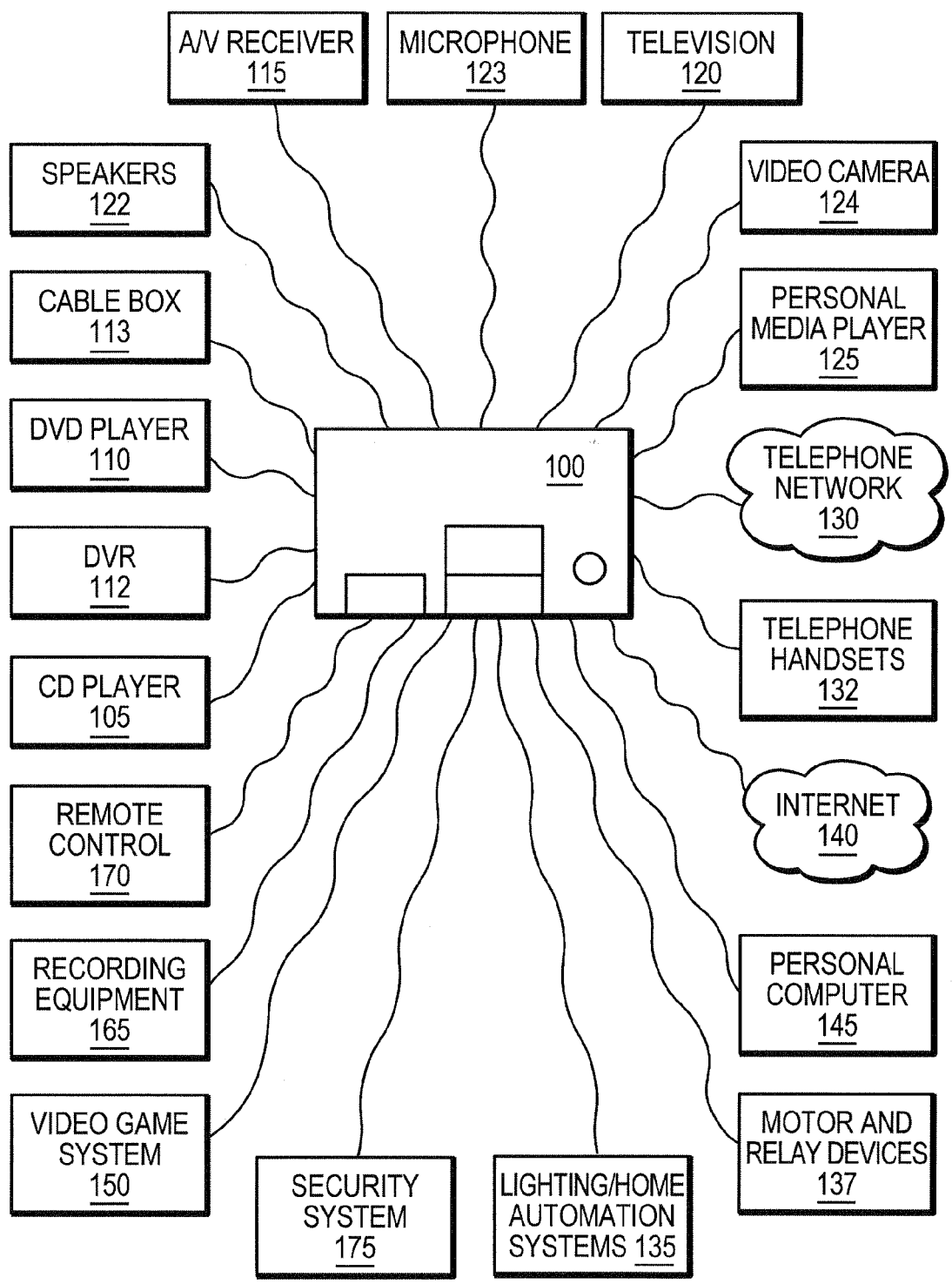
FIG. 1 is a block diagram of an example programmable multimedia controller (shown interconnected to a number of example external devices), in which a novel technique for mixing graphics with video images or other content may be employed.

FIG. 1 is a block diagram of an example programmable multimedia controller 100 (shown interconnected to a number of example external devices), in which a novel technique for mixing graphics with video images, or other content, may be employed. The term "programmable multimedia controller" should be interpreted broadly as a device capable of controlling, switching data between, and/or otherwise interoperating with, a variety of electrical and electronic devices, such as audio, video, telephony, data, security, motor-operated, relay-operated, and/or other types of devices. By interacting with these devices, the programmable multimedia controller 100 may implement an integrated multimedia control solution.

The example programmable multimedia controller 100 may connect to a wide range of audio and video components, for example, a compact disk (CD) player 105, a digital video disc (DVD) player 110, a digital video recorder (DVR) 112, a cable box 113, an audio/video receiver 115, a television 120, a personal media player 125, speakers 122, a microphone 123, and/or a video camera 124. The programmable multimedia controller may also connect to telephony devices such as a telephone network 130 and/or a telephone handset 132. The telephone network 130 may be a publicly switched telephone network (PSTN), an Integrated Services Digital Network (ISDN), or another type of communications network.

In addition, the programmable multimedia controller 100 may connect to variety of lighting and/or home automation systems 135. These devices may operate via the X10 protocol developed by Pico Electronics, the INSTEON™ protocol developed by SmartHome, Inc., the CEBus standard managed by the CEBus Industry Council, RS232, or another well known automation or control protocol. Similarly, the controller 100 may connect to motor and/or relay operated devices 137, which may include, for example, a heating, ventilation, and air conditioning (HVAC) system, an irrigation system, an automatic window shade or window blind system, an electronic door lock system, and/or other types of systems and devices.

A computer network, such as the Internet 140, preferably connects to the programmable multimedia controller 100. In addition, a personal computer (PC) 145, a video game systems 150, home or studio recording equipment 165, or other devices, may also connect to the controller 100. One or more remote control units 170 may be provided to manage the controller's functionality, and/or to control devices connected to the controller 100. Such remote control units 170 can interconnect to the controller 100 via a wired network connection, such as Ethernet over Category 5 (CAT5) cable, or a wireless connection, such as an infra-red link, a radio-frequency link, a Bluetooth™ link, a Zig-Bee™ link, a WI-FI link, or another appropriate wireless data connection.

Figure 2:
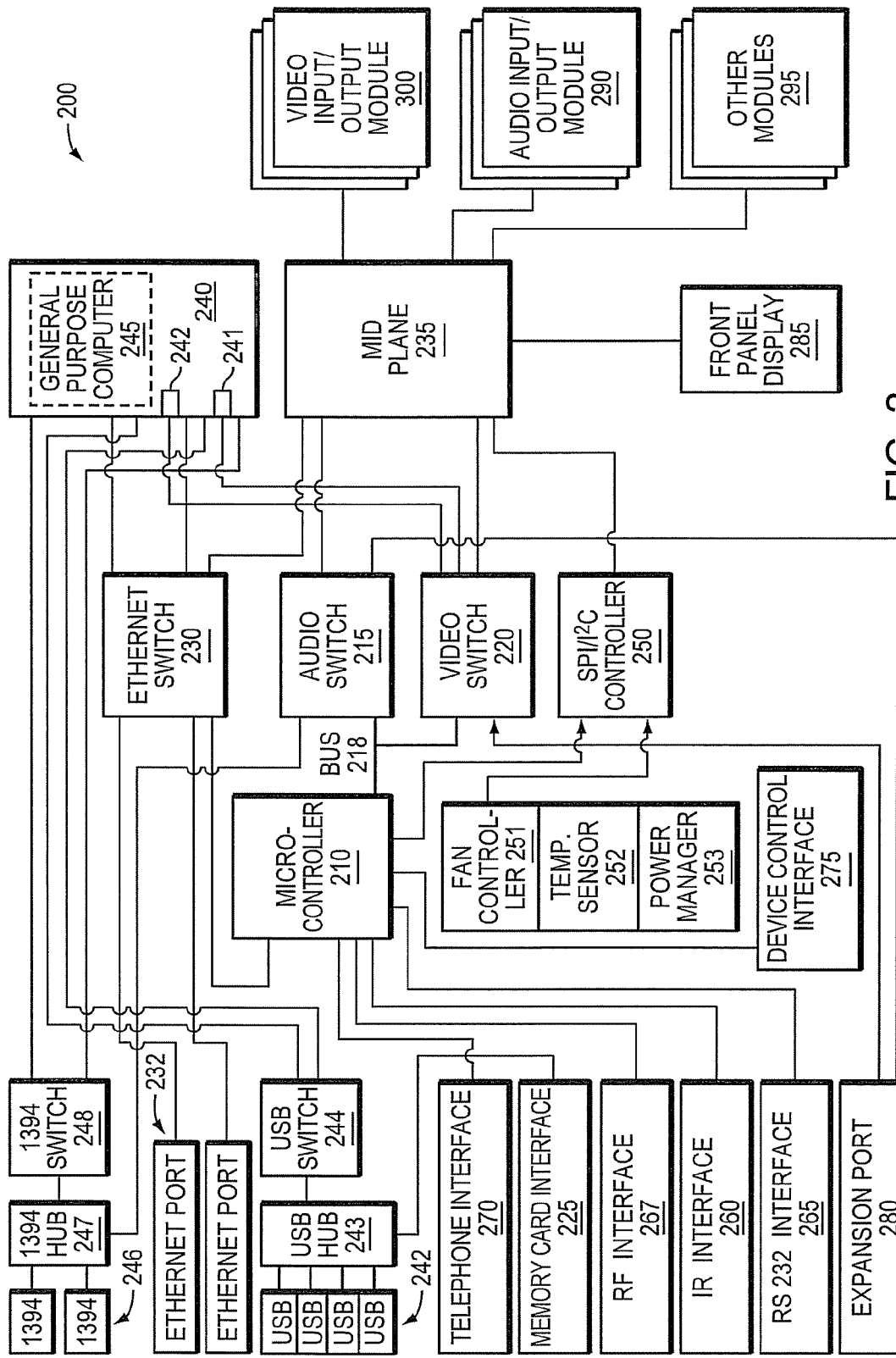
FIG. 2 is a schematic block diagram of an example high-level hardware architecture of the example programmable multimedia controller.

FIG. 2 is a schematic block diagram of an example high-level hardware architecture 200 for the example programmable multimedia controller 100. The various components shown may be arranged on a "motherboard" of the controller 100, or on a plurality of circuit cards interconnected by a backplane (not shown). A microcontroller 210 manages the general operation of the controller 100. The microcontroller 210, in some configurations, is coupled to an audio switch 215 and a video switch 220 via a bus 218. The audio switch 215 and the video switch 220 are preferably crosspoint switches capable of switching a number of connections simultaneously. However, many other types of switches capable of switching digital signals may be employed, for example Time Division Multiplexing (TDM) switches or other devices. Further, while two separate switches 215, 220 are shown, audio and video switching may be consolidated into a single switch that supports switching of both types of data, or the switches 215, 220 may not present in some configurations.

A mid plane 235 interconnects the audio and video switches 215, 220 to a variety of input and output modules, for example, one or more Video Input/Output Modules 300 (whose operating is discussed in detail below in relation to FIG. 3), one or more Audio Input/Output Modules 290, and/or one or more other modules 295. The mid plane 235 is further coupled to an Ethernet switch 230 that permits switching of 10BaseT, 100BaseT, Gigabyte Ethernet and/or other types of data signals. The Ethernet switch 230 interconnects Ethernet ports 232 and a processing subsystem 240 to the microcontroller 210.

In one embodiment, the processing subsystem 240 includes one or more "general-purpose computers" 245. A general-purpose computer 245, as used herein, refers to a device that is configured to execute a set of instructions, and depending upon the particular instructions executed, may perform a variety of different functions or tasks. Typically, but not always, a general-purpose computer 245 executes a general-purpose operating system, such as the Windows® operating system, available from Microsoft Corporation, the Linux® operating system, available from a variety of vendors, the OSX® operating system, available from Apple Inc., or another operating system. A general-purpose computer 245 may have any of a variety of form factors. For example, a general-purpose computer 245 may be a Central Processing Unit (CPU) card, a Single Board Computer (SBC), a PC/104 processing module, a conventional ATX form factor motherboard and CPU, an "off-the-shelf" small form factor general-purpose personal computer including a case, power supply, and other accessories, an "off-the-shelf" large form factor general-purpose personal computer including a case, power supply, and other accessories, and/or a rack-mount general-purpose personal computer including a case, power supply, and other accessories. The general-purpose computer 245 may include a storage device, for example a hard drive, a Compact Disc read-only memory (CDROM) drive, a Flash memory, or other type of storage device, and/or may be interconnected to a storage device provided elsewhere in the processing subsystem 240.

The processing subsystem 240 preferably has one or more graphics outputs 241, 242 such as analog Video Graphics Array (VGA) connectors, Digital Visual Interface (DVI) connectors, Apple Display Connector (ADC) connectors, or other type of connectors, for supplying graphics. Such graphics outputs 241, 242 may, for example, be supplied directly from the one or more general-purpose computers 245 of the processing subsystem 240. As used herein, the term "graphics" should be interpreted broadly to encompass a wide variety of computer graphics, text, full-motion video, still images, or other types of visual data, represented in any of a variety of different color spaces, for example RGB, YCrCb, etc, at any of a variety of different color depths, for example 8-bit color, 16-bit color, 24-bit color, 32-bit color etc. The graphics from the processing subsystem 240 are passed to the video switch 220, in some configurations, and then switched to other parts of the programmable multimedia controller 100, for example to a Video Input/Output Module 300. Alternately, the graphics from the processing subsystem 240, in some arrangements, may pass directly to a module, such as the Video Input/Output Module 300.

The example programmable multimedia controller 100 further includes a number of Universal Serial Bus (USB) ports 242 interconnected to a USB hub 243. A memory card interface 225 is also connected to the USB hub 243. The interface may accept one or more well-known memory card formats, for example CompactFlash™ cards, Memory Stick™ cards, Secure Digital™ (SD) cards, or other formats. A USB switch 244 is employed to switch USB links to the processing subsystem 240. In a similar manner, a number of IEEE 1394 (FireWire™) ports 246 are interconnected to an IEEE 1394 hub 247 and to an IEEE 1394 switch 248, for switching to the processing subsystem 240.

The microcontroller 210 is further connected to a Serial Peripheral Interface (SPI) and Inter-Integrated Circuit ($I^2C$) distribution circuit 250, which provides a serial communication interface to relatively low data transfer rate devices. The SPI/$I^2C$ controller 250 is connected to the mid plane 235 and thereby provides control commands from the microcontroller 210 to the modules 290, 295, 300 and other devices of the programmable multimedia controller 100. Further, connections from the SPI/$I^2C$ controller 250 are provided to devices such as a fan controller 251, a temperature sensor 252, and a power manager circuit 253, which collectively manage the thermal characteristics of the programmable multimedia controller 100 and prevent overheating.

The microcontroller 210 is also connected to an Infra-Red (IR) interface 260, an RS232 interface 265, and a RF interface 267, that permit further interconnection with external devices. Also, a device control interface 275 is provided to communicate with lighting, home automation, and motor and/or relay operated devices. It is expressly contemplated that various other interfaces, including WI-FI, Bluetooth™, ZigBee™ and/or other wired and wireless interfaces, may be employed by the programmable multimedia controller 100.

Finally, an expansion port 280 is provided for linking several programmable multimedia controllers 100 together, to form an expanded system, while a front panel display 285, for example a touch screen Liquid Crystal Display (LCD) display, is provided to display status, configuration, and/or other information to a user, as well as to accept user input.

Figure 3:
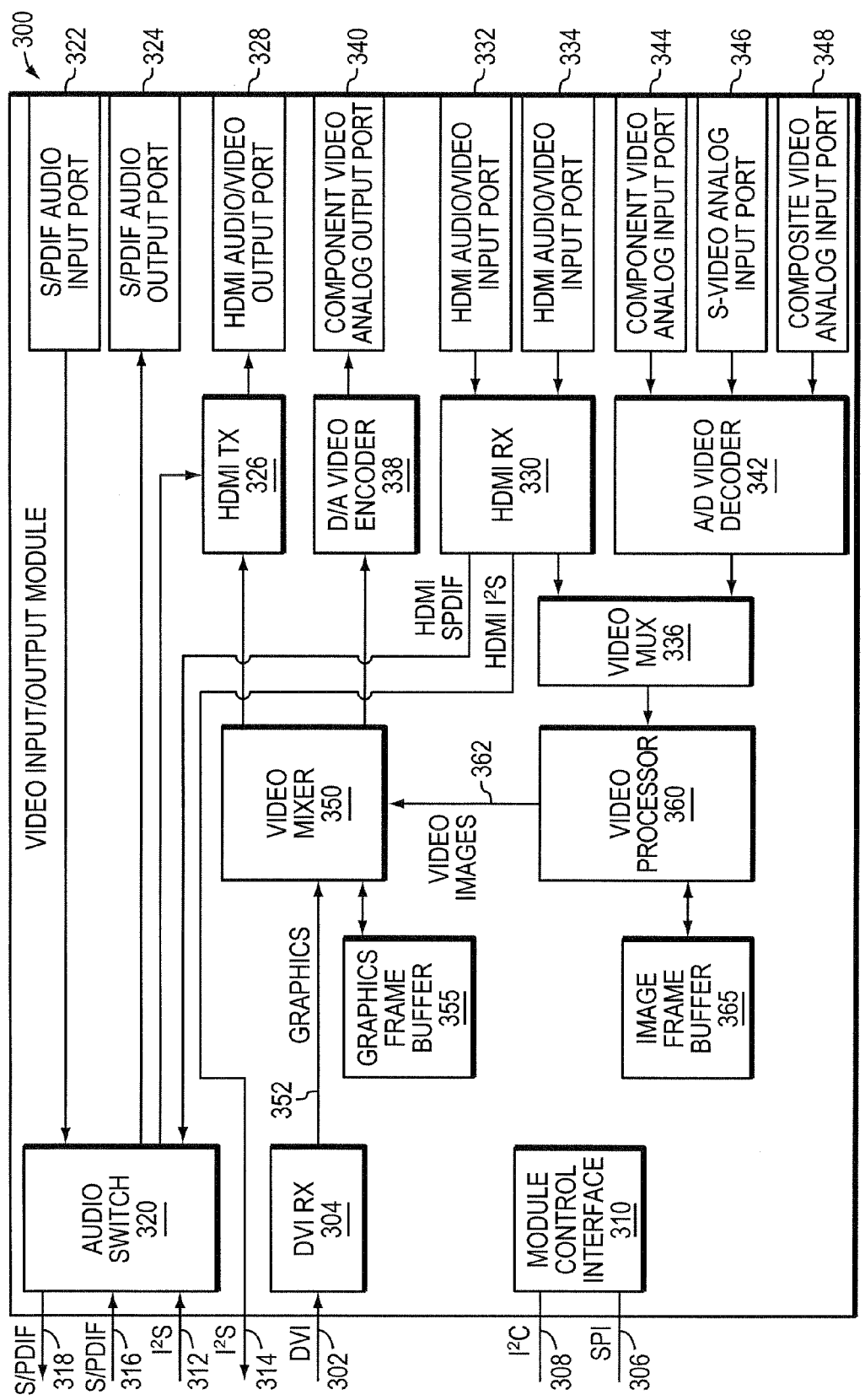
FIG. 3 is a schematic block diagram showing an enlarged view of an example Video Input/Output Module of the example programmable multimedia controller.

FIG. 3 is a schematic block diagram showing an enlarged view of an example Video Input/Output Module 300. In the configuration shown, the Video Input/Output Module 300 is interconnected to the mid plane 235 of the programmable multimedia controller 100 via a number of connections. A graphics connection 302 receives graphics, such as computer graphics, text, full-motion video, still images, or other types of visual data, originating, for example, from a graphics output 241, 242 of the processing subsystem 240. The graphics connection 302 passes the graphics to a receiver 304 of the module 300. The graphics connection 302 may be a Transition Minimized Differential Signaling (TMDS) DVI connection and the receiver 304 a DVI receiver, however a variety of other types of connections and receivers may alternately be employed. The receiver 304 may reformat and convert the color space of the graphics, for example, convert the graphics to the RGB color space with 24-bit color depth and 4:4:4 chroma subsampling. It should be remembered that in different embodiments different graphics formats may be used, and, for example, the receiver 304 may alternately convert the graphics to a different color space, such as YCrCb color space, with different color depth, and with different chroma subsampling. After conversion, the graphics are passed along a graphics link 352 to a video mixer 350, whose operation is discussed in detail below.

One or more control connections, such as Serial Peripheral Interface (SPI) connections 306 and/or Inter-Integrated Circuit ($I^2C$) connections 308, provide data links between the microcontroller 210 and a module control interface 310. The module control interface 310, in response to control signals, is configured to issue appropriate control commands to the other components in the Video Input/Output Module 300. Also, a plurality of Integrated Interchip Sound ($I^2S$) audio input connections 312 and output connections 314, as well as one or more Sony/Philips Digital Interface Format (S/PDIF) audio input connections 316 and output connections 318, pass audio signals to and from the mid plane 235.

In addition to the above described interconnections to the mid plane 235, the Video Input/Output Module 300 has a number of ports for interconnecting to external devices. One or more audio input ports, such as a S/PDIF audio input port 322, are provided to interconnect to external audio sources, for example CD players, personal media players, A/V receivers, etc. Similarly, one or more audio output ports, such as a S/PDIF audio output port 324, are provided to interconnect to external audio destinations, for example A/V receivers, amplifiers, recording devices, etc. An audio switch 320, for example an audio crosspoint switch, is configured to switch audio signals between the audio connections 312, 316, 318 and the audio ports 322, 324.

An HDMI transmitter 326 is provided to drive one or more HDMI Audio/Video output ports 328 that provide digital audio and video image data to interconnected audio/video destinations, for example televisions, A/V receivers, DVRs, or other destinations. The HDMI transmitter obtains audio data from the audio switch 320, while video image data is obtained from the video mixer 350. Similarly, an HDMI receiver 330 receives audio and video image data from one or more HDMI Audio/Video Input Ports 322, 334 interconnected to audio/video sources, such as cable boxes, DVD players, A/V receivers, DVRs, or other sources. The HDMI receiver 330 passes the audio data to the audio switch 320, and passes the video image data to a video multiplexer 336.

A digital to analog (D/A) video encoder 338 is provided to convert digital video image data from the video mixer 350 to component analog video image data, to drive one or more component video analog output ports 340 interconnected to video destinations. Similarly, an analog to digital (A/D) video decoder 342 receives analog video image data from one or more component video analog input ports 344, one or more separate-video (commonly referred to as S-video) analog input ports 346, and/or one or more composite video analog input ports 348, interconnected to video sources. The A/D video decoder 342 converts the analog video image data to digital video image data that may be passed to the video multiplexer 336.

At the heart of the Video Input/Output Module 300 is a video processor 360 and a video mixer 350. The video processor 360, in one configuration, is a 10-bit single-chip dual-channel image processor. The video processor 360 receives video image data originating from external video sources attached to input ports 332, 334, 344, 346, 348 through the video multiplexer 336. The video processor may perform a variety of scaling, de-interlacing, noise reduction, detail enhancement, brightness control, contrast control, color control and/or other types of processing upon each video image in the video image data. Video images may be temporarily stored in an image frame buffer 365, such as a double data rate (DDR) synchronous dynamic random access memory (SDRAM). These video images are then passed to the video mixer 350 along a video image link 362.

The video mixer 350 may be a programmable logic device (PLD), for example a field programmable gate array (FPGA), yet alternately may be a purpose-built chip, such as an application specific integrated circuit (ASIC), a collection of several chips on a circuit board, and/or another type of device. A graphics frame buffer 355, such as a double data rate (DDR) synchronous dynamic random access memory (SDRAM), interconnected to the video mixer 350, provides temporary storage of graphics.

The video mixer 350 may implement a novel technique for mixing graphics, for example graphics originating from the processing subsystem 240, with video images, for example video images originating from an external video source, or with other content. While a typical on-screen display (OSD) function is common in video systems, conventional OSD functions are generally quite limited, and typically may only display limited types of specially formatted text and symbols, at particular, predetermined, often rectangular regions of a video image. The novel techniques for mixing graphics and video images, or other content, described herein, free OSDs from these constraints and permit a wide variety of different types of graphics (including computer graphics, text, full-motion video, still images, or other types of high quality visual data) to be mixed with video images of a video data signal, in any desired regions, the regions chosen on a pixel-by-pixel (or near pixel-by-pixel) basis. Further, the locations of the graphics may be dynamically changed on an image-by-image basis, readily permitting the movement of the graphics about a display screen, or permitting other "special effects." Further, using the techniques described herein allows graphics to be readily blended with the video images, to display the graphics in a semi-transparent manner, with fade-in/fade-out effects, or with other types of "special effects."

Figure 4:
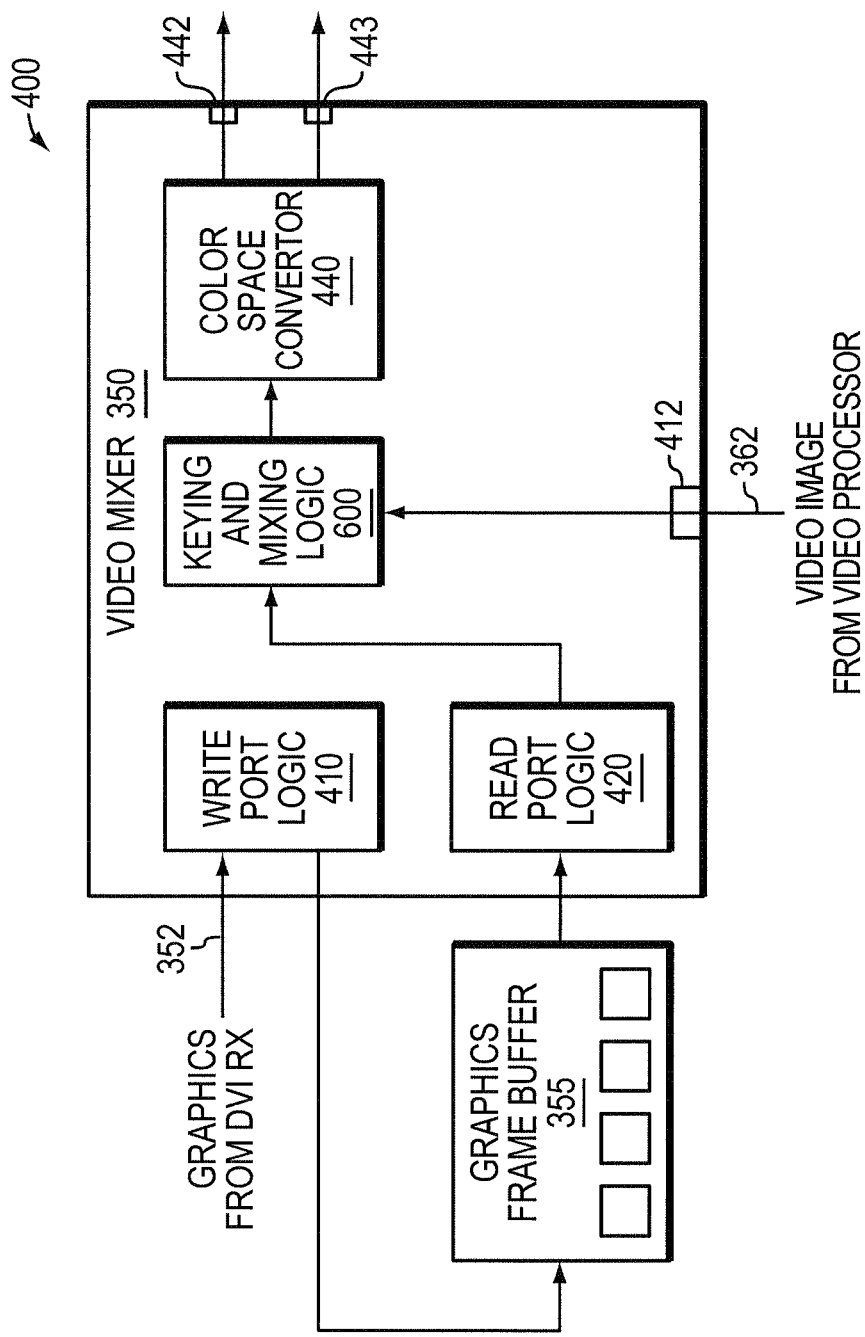
FIG. 4 is a schematic block diagram showing an enlarged view of an example video mixer that may implement a novel technique for mixing graphics with video images or other content.
Figure 8:
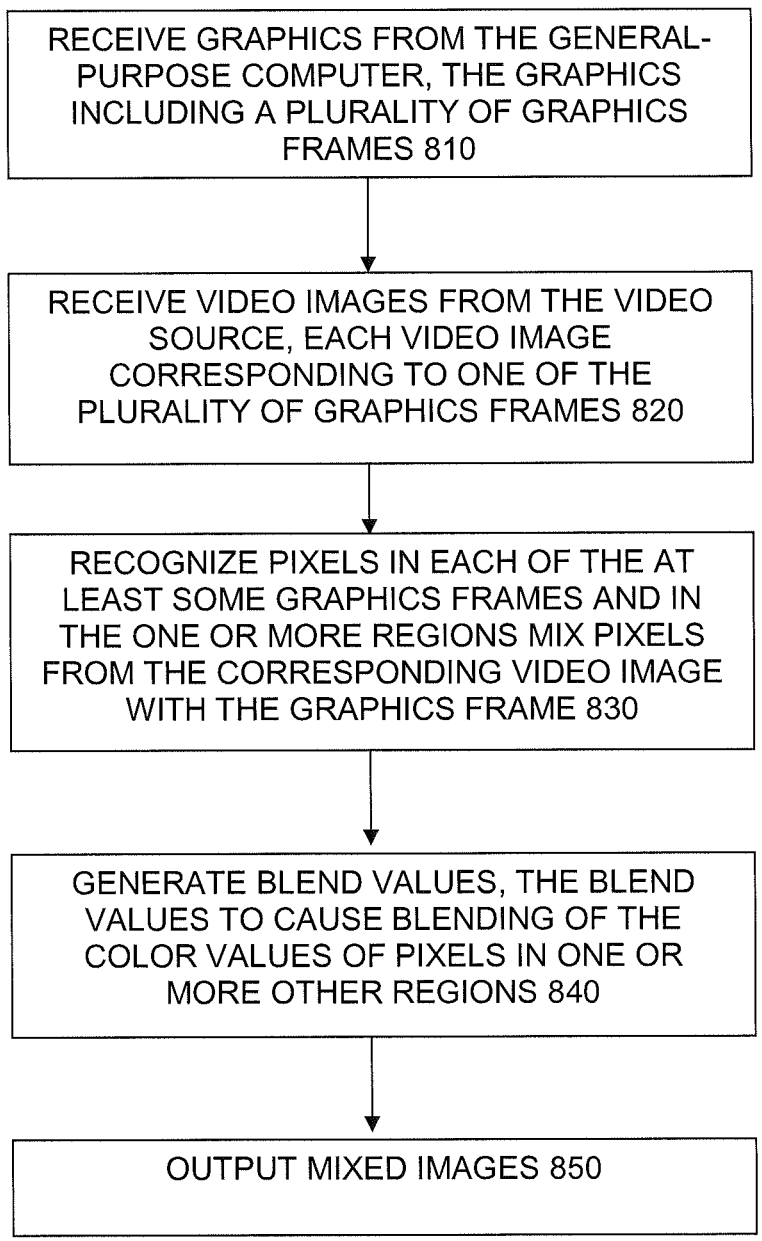
FIG. 8 is a flow diagram showing an example sequence of steps.

FIG. 4 is a schematic block diagram 400 showing an enlarged view of an example video mixer 350 that may implement a novel technique for mixing graphics with video images or other content. An interface of the video mixer 350, such as write port logic 410, receives income graphics from the graphics link 352 (see also FIG. 8, 810) and writes the graphics to the graphics frame buffer 355, according to the timing of the incoming graphics. Read port logic 420 reads the graphics from the frame buffer according to timing provided from the video processor 360, thereby synchronizing the graphics with the video images arriving from the video processor 360 along the video image link 362 coupled to a video image interface and/or receiver 412 (see also FIG. 8, 820). Once synchronized, the graphics are passed to keying and mixing logic 600, which operates to mix the graphics and the video images.

The keying and mixing logic 600 looks to keying information incorporated into the graphics, to determine where the graphics should be displayed and where the video images should be displayed. The individual graphics frames of the graphics are preferably scaled (by the source of the graphics) to match the video processor's output resolution. Each pixel in a particular graphics frame of the graphics is preferably arranged to correspond with a pixel in a corresponding video image. The source of the graphics, for example the processing subsystem 240, or a separate graphics processing device (not shown) that is not the source, sets the color value of pixels in each graphics frame according to a keying scheme, to designate regions where pixels of the video image should be displayed, and regions where pixels of the graphics frame should be displayed. Specifically, where the video image is desired to be displayed, pixel color values are changed to one or more predetermined color values.

Figure 5:
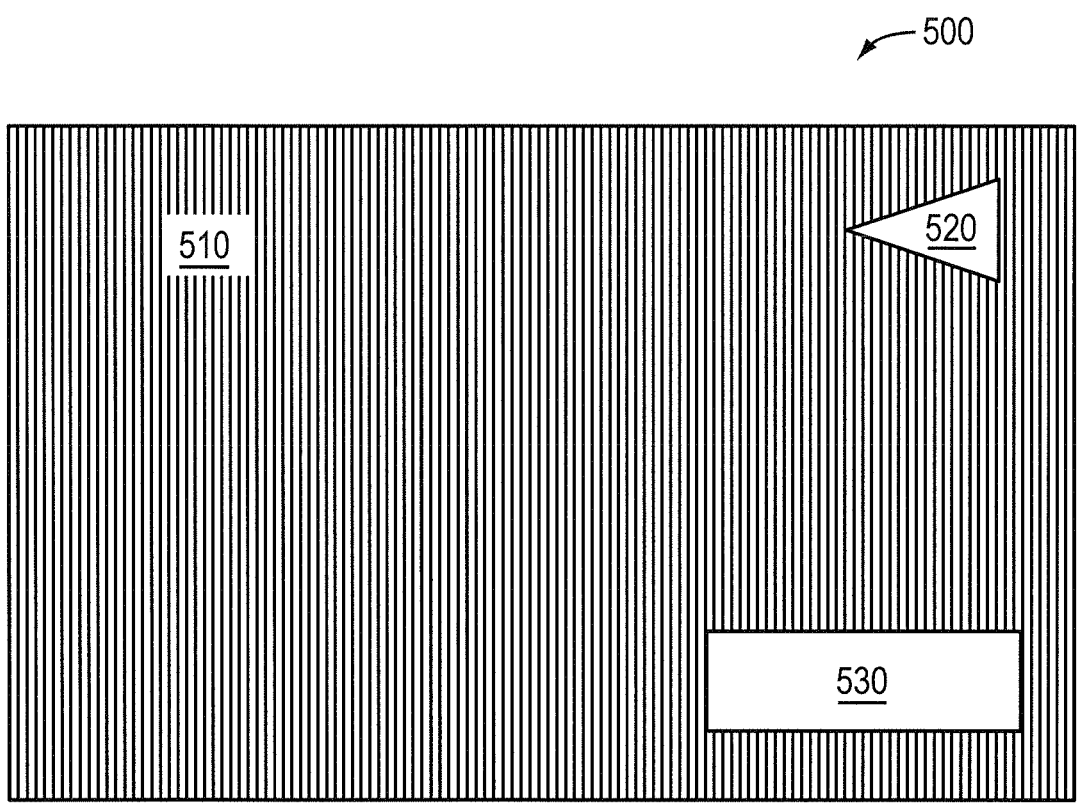
FIG. 5 is a diagram of an example graphics frame that illustrates the use of a keying scheme.

For example, referring to FIG. 5, which is a diagram of an example graphics frame 500, the pixels of a "background" region 510 are changed to have one or more predetermined color values, to designate that pixels of the video image should be displayed in this region. The color values of the pixels in the remaining regions, specifically the two other graphics regions 520, 530, are not changed to the one or more predetermined color values, and simply represent actual graphics pixels, i.e., the graphics to be displayed to a user. As is explained in more detail below, the keying and mixing logic 600 recognizes pixels that are changed to the one or more predetermined color values, and mixes the graphics and the video images in response (see also FIG. 8, 830). In this manner, a mixed image is created. Thereafter, the mixed image may be passed to a color space converter (FIG. 4, 440), and then is output on one or more output interfaces 442, 443 of the video mixer 350, to eventually be displayed to a user, stored, or otherwise used (see also FIG. 8, 850).

In an embodiment, where the graphics are represented in the RGB color space with 24-bit color depth, the one or more predetermined color values may take the form of one or more 8-bit Red, 8-bit Green, and 8-bit Blue values for each pixel. It should be remembered, however, that the techniques described herein are in no way limited to the RGB color space, or to use with graphics having 24-bit color depth, and that other color spaces, for example the YCrCb color space, and other color depths, for example, 32-bit color depth, may readily be employed with these techniques.

Various keying schemes may employ different predetermined color values. In one embodiment, a predetermined single color value may be used, for example a color value of Red=0, Green=96, and Blue=0 for all pixels. In such an embodiment, the processing subsystem 240 changes the color value of the pixels in a graphics frame to this single color value where video image pixels are to be displayed. Preferably, the predetermined single color value is chosen as a color that occurs "naturally" at a lower than average frequency in typical graphics. Alternately, the predetermined single color value may be arbitrarily chosen. Generally, due to the large number of colors that may be represented with commonly used color depths, any "natural" occurrence of pixels having the predetermined single color value will be relatively rare. For example, with a 24-bit color depth, approximately 16.7 million unique colors may be represented, causing pixels of any one color to appear very seldom. Therefore, any potential "artifacts" or irregularities caused by "natural" occurrences of pixels of the predetermined single color are often unnoticeable, and may be ignored. Alternately, prior to changing the color values of certain pixels of a graphics frame to the single predetermined color, the graphics frame may be scanned for "natural" occurrences of the single predetermined color, and any such pixels changed to a nearly identical color, for example by adding or subtracting one or more bits to the color value of such pixels. In this manner, the issue of "natural" occurrence may be obviated.

In another, preferred, embodiment, a pattern of predetermined color values occurring in nearby pixels may be used, rather than a single predetermined color value. For example, a two-color repeating pattern may be employed, where the processing subsystem 240, or a separate graphics processing device (not shown), changes the color values of horizontally adjacent pixels in a graphics frame to alternating different predetermined colors, to designate a region where video image pixels are to be displayed. In such a two-color repeating pattern, even numbered pixels may be changed, for example, to a first predetermined color value of Red=0, Green=96, and Blue=0, while odd numbered pixel may be changed, for example, to a second predetermined color value of Red=96, Green=0, and Blue=96. To detect the pattern, the keying and mixing logic 600 performs a comparison on a number of pixels in the graphics frame. For example, for the two-color repeating pattern discussed above, the keying and mixing logic 600 may compare 3 adjacent pixels at a time, looking for a pixel of color Red=0, Green=96, and Blue=0, followed by a pixel of color Red=96, Green=0, and Blue=96, followed by another pixel of color Red=0, Green=96, and Blue=0. If the keying and mixing logic 600 determines such a 3-pixel pattern is present, it then mixes the graphics and the video images, so that video image pixels are shown where the 3-pixel pattern is present.

While in some configurations the keying and mixing logic 600 may look for an to exact match of the pattern of predetermined color values (for example, may look for 3 adjacent pixels with exact color values of Red=0, Green=96, and Blue=0; Red=96, Green=0, and Blue=96; and Red=0, Green=96, and Blue=0), certain additional advantages may be obtained by looking instead for pixels with color values above certain thresholds and/or having certain relative relationships. Various general-purpose operating systems, for example the OSX® operating system, which may be employed in a general-purpose computer 245 of the processing subsystem 240, include a variety of shadowing, blending, and other types of "special effects" to "improve" the appearance of menus, text, and other displayed objects. Such shadowing, blending, and other types of "special effects" may be problematic if the video output of the general-purpose computer 245 is used as the source of the graphics, and an exact color value match is sought. Specifically, the operating system (absent special reconfiguration) may apply the shadowing, blending, and other effects to certain portions of the pattern of predetermined color values, causing the color values in some portions to be altered somewhat, and therefore unrecognizable if an exact match sought employed. For example, considering the two-color pixel pattern discussed above of Red=96, Green=0, and Blue=96 for even pixels, and Red=0, Green=96, and Blue=0 for odd pixels, most pixels so set will maintain these values. However, pixels close to a non-pattern graphics may be "shadowing", "blended" or otherwise altered by the graphics source. That is, certain pattern pixels close to a non-pattern graphics may be altered to pixel color values of, for example, Red=48, Green=0, and Blue=48 for even pixels and Red=0, Green=48, and Blue=0 for odd pixels.

The problem of recognizing altered pattern pixels may be minimized, or obviated, by looking instead for pixels with color values above certain thresholds and/or having certain relative relationships. For example, if the pattern is the two-color, 3-pixel pattern discussed above, the relation to thresholds and the relative difference between the red, green, blue values may be considered. For example, a match may be declared if it is detected that a first pixel has Green<65, (Blue-Green)>32, and (Red-Green)>32; followed by a second pixel that has Blue<32, Red<32, (Green-Blue)>32, and (Green-Red)>32; followed by a third pixel that has Green<65, (Blue-Green)>32, and (Red-Green)>32. If such thresholds and/or relative relationships are considered, the pattern of predetermined color value may still be matched, despite considerable shadowing, blending, and other effects being present in the graphics from the source. Accordingly, a more robust system is obtained.

While the above description discusses the example of a two-color, 3-pixel pattern, it should be apparent that, depending on the particular implementation, a wide variety of different patterns may be employed. For example, the number of different colors and their exact color values may vary. Similarly, the number of pixels compared to detect a match may vary. Depending on the particular implementation, the relative location of the pixels of a pattern may vary. For example, the pixels of the pattern may be horizontally adjacent in the graphics frame, vertically adjacent, diagonally adjacent, horizontally proximate (i.e., not adjacent, but within a certain range), vertically proximate, etc. Further, the techniques for comparing pixels to look for a match may be varied. Various thresholds and/or relative relationship among color values may be examined. For example, in addition to looking to thresholds and/or relative relationships among the color values of individual pixels, thresholds and/or relative relationships may be examined for collections of several pixels. That is, the color values of several pixels may be compared, combined, or otherwise collectively examined in determining a match. Accordingly, the above descriptions should be interpreted broadly to encompass such implementation variations.

Figure 6:
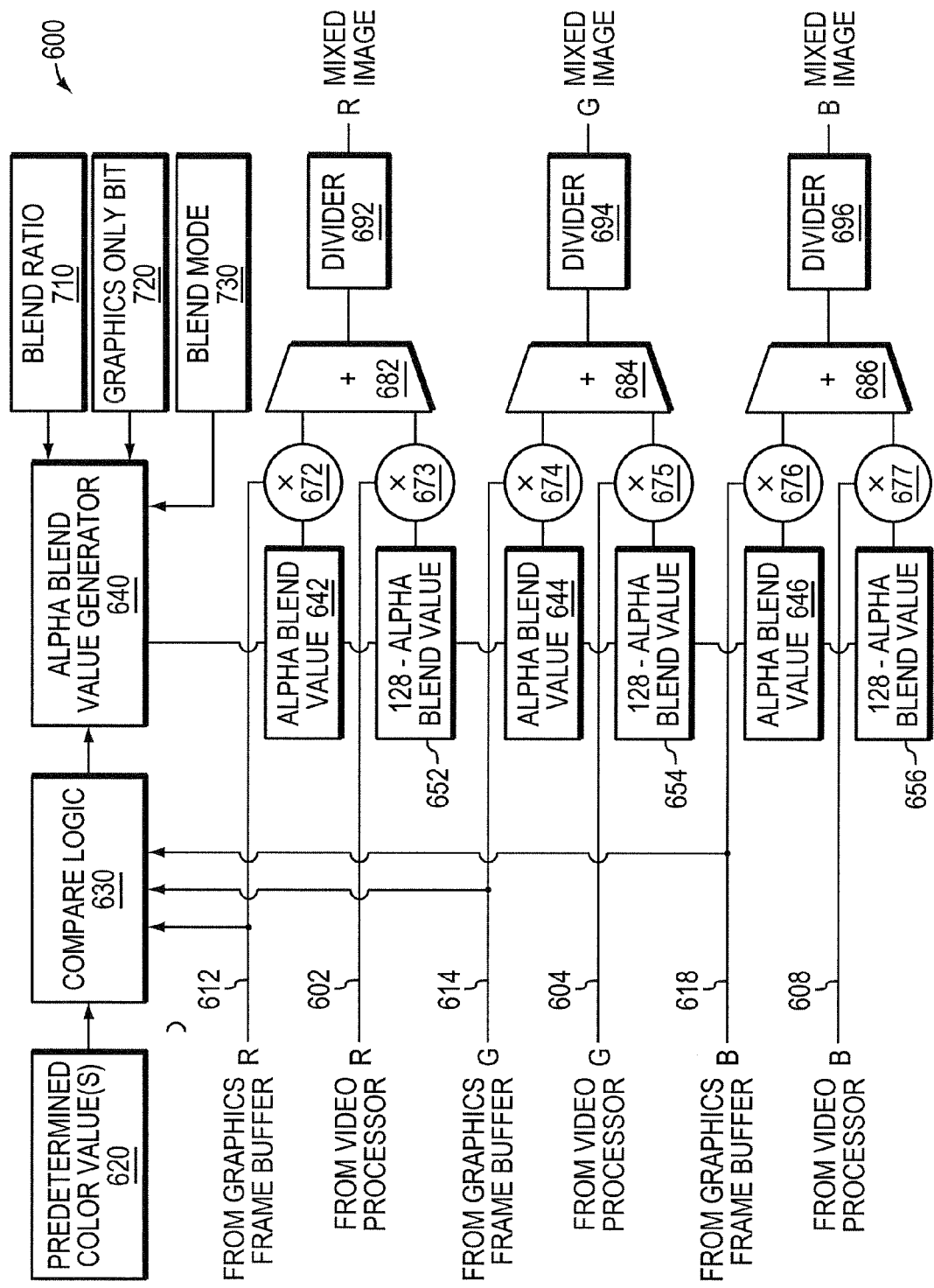
FIG. 6 is a block diagram showing an enlarged view of example color keying and mixing logic.

FIG. 6 is a block diagram showing an enlarged view of example color keying and mixing logic. Video images pixels are received from the video processor 362 on lines 602, 604, 608. Similarly, graphics frame pixels are received from the graphics frame buffer 355 on lines 612, 614, 618. Compare logic 630 compares one or more predetermined color values 620 to the color values of the graphics pixels on lines 612, 614, 618 and determines if there is a match, for example looking for a predetermined single color value, a pattern of predetermined color values, or some other indicia of a match. When a match occurs, it is determined that video image pixels should be passed. When no match occurs, it is determined that graphics frame pixels should be passed.

When graphics frame pixels should be passed, the graphics pixels may be passed unaltered, or may be blended with video image pixels to display the graphics in a semi-transparent manner, with a fade-in or fade-out effects, and/or with some other type of "special effects." In one embodiment, blending may be tailored in a variety of ways, such that a mode (i.e., a type) of blending, a ratio (i.e., a degree) of blending, and/or other characteristics of blending may be selected that are suited for a particular situation. Further, as discussed below, certain types of blending may be employed to advantageously minimize or otherwise obscure certain artifacts, such as edge artifacts or "jaggies" (i.e., stairs-like lines that appear where there should be a smooth boundary), that may be a by-product of mixing graphics and video images.

FIG. 7 is a diagram of an example data structure 700 for specifying a blending ratio 710, a blending mode 720, and/or other characteristics of blending graphics and video images. A plurality of such data structures 700 may simultaneously be employed, each specifying characteristics for a particular portion or area of the graphics frame. The blending ratio 710, specified in a first field, may vary between a value, for example a value of 0x40, indicating nearly the full graphics pixel color values should be passed, to a value, for example a value of 0x00, indicating full or nearly full video image pixel color values should be passed. A graphics only bit 720, in a second field, may be set to indicate only graphics pixel color values should be passed. Finally, a blend mode 730, specified in a third field, designates one of a number of different predefined blend modes that is to be employed.

For example, a first blend mode may be provided where graphics pixels are blended per the four most significant bits (MSBs) of the video image pixel intensity of the corresponding video image pixels, added to the blend ratio 710. In such a mode, the darker the video image pixel, the more transparent it will appear. A second example blend mode designates that graphics pixels are blended per the five MSBs of the video image pixel intensity of the corresponding video image pixels, added to the blend ratio 710. As in the first example blend mode, the darker the video image pixel, the more transparent it will appear. This property cause the first and second blend modes to be suited for minimizing or otherwise obscuring many edge artifacts or "jaggies," and such modes may be employed when this result is desired.

A third example blend mode designates that graphics frame pixels are blended per the graphics frame pixel intensity added to the blend ratio 710. In such a mode, the darker the graphics frame pixel, the more transparent it will appear. Finally, a fourth example blend mode designates that graphics frame pixels that have an intensity greater than a certain threshold value are blended per the blend ratio 710, and graphics pixels with a value less than the certain threshold value are rendered completely transparent. It should be apparent that a variety of other blend modes are readily possible, and depending on the particular implementation may be employed to produce desired results.

With reference to FIG. 6 and FIG. 7, the blend ratio 710, the graphics only bit 720, and the blend mode 730 are passed to an alpha blend value generator 640. The alpha blend value generator 640 generates alpha blend values 642, 644, 646 for the pixels of the graphics frame. The alpha blend value generator 640 further generates alpha blend values 652, 654, 656 for the pixels of the video image (see also FIG. 8, 840), for example by subtracting the alpha blend values 642, 644, 646 for the pixels of the graphics frame from a constant. A plurality of multipliers 672, 673, 674, 675, 676, 677 multiply the pixel color values of the graphics frame and the video image by the respective alpha blend values. Thereafter, adders 682, 684, 686 add the adjusted pixel color values of the graphics frame and the video image and dividers 692, 694, 696 scale the results to an appropriate value range. In this manner, a mixed image may be generated pixel by pixel.

While the above description discusses certain embodiments of the present invention, it should be apparent that further modifications and/or additions may be made without departing from the invention's intended spirit and scope. Though the above description describes the novel technique for mixing graphics with video images as employed a Video Input/Output Module 300 of a programmable multimedia controller 100, it should be remembered that the technique is in no way limited to such a setting, and is widely applicable to a variety of different environments. For example the technique may alternately be employed in a video playback device, such as a DVD player, DVR, Multimedia server, etc.; a video processing device, such as a video mixer, a video switch, video processor/converter, etc.; a general-purpose computer; a special purpose processing or switching device adapted for use with video; or in any of a variety of other settings.

Further, while the above description describes that graphics are provided from a graphics subsystem 240, which may include a general-purpose computer 245 implementing a general-purpose operating system, it should be remembered that the graphics may alternately be provided from a variety of other sources. For example, rather than employ a processing subsystem 240, graphics may be provided from an external general-purpose computer interconnected by a network or video link. Similarly, graphics may be provided by an A/V receiver, multimedia server, video playback device, or any other device capable of providing an appropriate graphics signal.

Further, while the above description discusses mixing graphics with video images, the reader is reminded that graphics may be readily mixed with other content using very similar techniques. Such other content may include still images, computer graphics, text, or other types of visual data.

Further, while the above description describes use of one predetermined single color value and/or one predetermined pattern of color values at a time, in alternate embodiments several different predetermined single color values and/or several different predetermined patterns of color values may simultaneously be employed. Use of multiple colors, patterns, or other indicia may permit mixing of graphics with a plurality of different video images. For example, each predetermined single color value and/or each predetermined pattern of color values may be used to designate where video image pixels from a particular video image source should be displayed. Alternately, certain colors or patterns may have other predefined meanings and be used to trigger special actions.

Further, while the above description refers to a variety of specific hardware units for executing various functions, it should be remembered that many of the techniques discussed herein may alternately be implemented by a variety of different hardware structures (for example a variety of different programmable logic circuits, specially-designed hardware chips, analog or partially-analog devices, and other types of devices), may be implemented in software (for example as computer-executable instructions stored in a computer-readable storage media for execution on a processor), or may be implemented in a combination of hardware and software. Accordingly, it should be remembered that the above descriptions are meant to be taken only by way of example.

What is claimed is:

1. An apparatus for mixing graphics from a general-purpose computer with video images from a video source, comprising:
   a first interface configured to receive graphics from the general-purpose computer, the graphics including a plurality of graphics frames composed of pixels that each have a color, the color of each pixel represented in a red, green, blue (RGB) color space, at least some graphics frames including one or more regions having pixels set to a repeating pattern of predetermined colors, the repeating pattern of predetermined colors defined by two or more nearby pixels where a first pixel has two or more of a red value, a green value, and a blue value that have a first relative difference and the first relative difference has a first particular less than or greater than relation to a first threshold, and a second pixel has two or more of a red value, a green value, and a blue value that have a second relative difference and the second relative difference has a second particular less than or greater than relation to a second threshold;
   a second interface configured to receive video images from the video source, each video image corresponding to one of the plurality of graphics frames;
   a video mixer including logic configured to recognize pixels in each of the at least some graphics frames that are set to the repeating pattern of predetermined colors, and in the one or more regions where the pixels are set to the repeating pattern of predetermined colors to mix pixels from the corresponding video image with the graphics frame, to create a mixed image; and one or more output interfaces to output mixed images.

2. The apparatus of claim 1, wherein the at least some graphics frames include one or more other regions that do not have pixels set to the repeating pattern of predetermined colors, the one or more other regions including pixels of graphics intended to be displayed to a user.

3. The apparatus of claim 1, wherein the nearby pixels are adjacent pixels.

4. The apparatus of claim 3, wherein the repeating pattern of predetermined colors is a repeating pattern of two adjacent pixels.

5. The apparatus of claim 3, wherein the repeating pattern of predetermined colors is a repeating pattern of three or more adjacent pixels.

6. The apparatus of claim 1, wherein the video mixer is further configured to recognize pixels in the at least some graphics frames as set to the repeating pattern of predetermined colors by detecting pixels having two or more of a red value, a green value, and a blue value whose relative difference has the first particular relation to the first threshold and by detecting pixels having two or more of a red value, a green value, and a blue value whose relative difference has the second particular relation to the second threshold.

7. The apparatus of claim 1, further comprising:

an alpha blend value generator configured to generate blend values, the blend values to cause blending of the colors of pixels in one or more other regions that do not have pixels set to the pattern of predetermined colors to be blended with color values of pixels in the corresponding video image.

8. A method for mixing graphics from a general-purpose computer with video images from a video source, comprising:

receiving graphics at a video mixer from the general-purpose computer, the graphics including a plurality of graphics frames composed of pixels that each have a color, the color of each pixel represented in a red, green, blue (RGB) color space, at least some graphics frames including one or more regions having pixels set in a repeating pattern of predetermined colors, the repeating pattern of predetermined colors defined by two or more nearby pixels where a first pixel has two or more of a red value, a green value, and a blue value that have a first relative difference and the first relative difference has a first particular less than or greater than relation to a first threshold, and a second pixel has two or more of a red value, a green value, and a blue value that have a second relative difference and the second relative difference has a second particular less than or greater than relation to a second threshold;

receiving video images from the video source, each video image corresponding to one of the plurality of graphics frames;

recognizing pixels in each of the at least some graphics frames that are set to the repeating pattern of predetermined colors;

in the one or more regions where the pixels are set to the repeating pattern of predetermined colors, mixing pixels from the corresponding video image with the graphics frame to create a mixed image; and outputting mixed images.

9. The method of claim 8, wherein the at least some graphics frames include one or more other regions that do not have pixels set to the repeating pattern of predetermined colors, the one or more other regions including pixels of graphics intended to be displayed to a user.

10. The method of claim 8, wherein the nearby pixels are adjacent pixels.

11. The method of claim 10, wherein the repeating pattern of predetermined colors is a repeating pattern of two adjacent pixels.

12. The method of claim 10, wherein the repeating pattern of predetermined colors is a repeating pattern of three or more adjacent pixels.

13. The method claim 8, further comprising:

generating blend values, the blend values to cause blending of the colors of pixels in one or more other regions that do not have pixels set to the pattern of predetermined colors to be blended with color values of pixels in the corresponding video image.

14. An apparatus for mixing graphics from a general-purpose computer with video images from a video source, comprising:

a first interface configured to receive graphics from the general-purpose computer, the graphics including a plurality of graphics frames composed of pixels that each have a color, the color of each pixel represented in a color space, at least some graphics frames including one or more regions having pixels set to a repeating pattern of predetermined colors, the repeating pattern of predetermined colors defined by two or more nearby pixels where a first pixel has two or more values whose difference has a first less than or greater than relation to a first threshold, and the second pixel has two or more values whose difference has a second particular less than or greater than relation to a second threshold;

a second interface configured to receive video images from the video source, each video image corresponding to one of the plurality of graphics frames;

a video mixer including logic configured to recognize pixels in each of the at least some graphics frames that are set to the repeating pattern of predetermined colors, and in the one or more regions where the pixels are set to the repeating pattern of predetermined colors to mix pixels from the corresponding video image with the graphics frame, to create a mixed image; and one or more output interfaces to output mixed images.

15. The apparatus of claim 14, wherein the repeating pattern of predetermined colors is defined by three or more nearby pixels.

16. The apparatus of claim 14, wherein the two or more values of the first pixel and of the second pixel comprise two or more of a red value, a green value, and a blue value.

17. The apparatus of claim 14, wherein the first interface, the second interface, the video mixer, and the one or more output interfaces are included in a programmable multimedia controller interconnected to and configured to control a plurality of different types of devices, and the video source is an audio/video (AV) device interconnected to the programmable multimedia controller.

18. The apparatus of claim 16, wherein the general-purpose computer is included in a processing subsystem of the programmable multimedia controller.

* * * * *

UNITED STATES PATENT AND TRADEMARK OFFICE
CERTIFICATE OF CORRECTION

PATENT NO.        : 8,659,704 B2
APPLICATION NO.   : 11/687511
DATED             : February 25, 2014
INVENTOR(S)       : Robert P. Madonna et al.

Page 1 of 1

It is certified that error appears in the above-identified patent and that said Letters Patent is hereby corrected as shown below:

In the Specification:
Col. 9, line 25 should read:
~~600 may look for an to exact match of the pattern of prede-~~
<u>600 may look for an exact match of the pattern of prede-</u>

Signed and Sealed this
Twenty-seventh Day of May, 2014

Michelle K. Lee
*Deputy Director of the United States Patent and Trademark Office*